United States Patent
Trux et al.

(10) Patent No.: US 7,577,440 B2
(45) Date of Patent: Aug. 18, 2009

(54) INTELLIGENT INTERSECTION APPARATUS AND METHOD FOR NETWORK-BASED POSITIONING

(75) Inventors: Antoine Trux, Helsinki (FI); Antti Sorri, Helsinki (FI); Jussi Jaakkola, Helsinki (FI)

(73) Assignee: Nokia Corporation, Espoo (FI)

( * ) Notice: Subject to any disclaimer, the term of this patent is extended or adjusted under 35 U.S.C. 154(b) by 597 days.

(21) Appl. No.: 11/105,398

(22) Filed: Apr. 14, 2005

(65) Prior Publication Data

US 2006/0234673 A1 Oct. 19, 2006

(51) Int. Cl.
*H04W 24/00* (2009.01)
(52) U.S. Cl. .................. 455/456.1; 455/456.5
(58) Field of Classification Search .............. 705/1, 705/400; 455/456.1, 404.2, 423, 406, 422.1, 455/456.5, 456.6, 456.3; 703/2
See application file for complete search history.

(56) References Cited

U.S. PATENT DOCUMENTS

| | | | | |
|---|---|---|---|---|
| 5,973,643 | A * | 10/1999 | Hawkes et al. | 342/457 |
| 6,560,462 | B1 * | 5/2003 | Ravi et al. | 455/456.1 |
| 6,981,055 | B1 * | 12/2005 | Ahuja et al. | 709/238 |
| 7,039,418 | B2 * | 5/2006 | Amerga et al. | 455/456.1 |
| 7,116,701 | B2 * | 10/2006 | Mesecher | 375/145 |
| 7,203,503 | B2 * | 4/2007 | Cedervall et al. | 455/456.5 |
| 7,308,356 | B2 * | 12/2007 | Melaku et al. | 701/200 |
| 2002/0094820 | A1 * | 7/2002 | Keranen et al. | 455/456 |
| 2003/0017829 | A1 * | 1/2003 | Ching-Hsiang et al. | 455/446 |
| 2005/0003828 | A1 * | 1/2005 | Sugar et al. | 455/456.1 |
| 2005/0020279 | A1 * | 1/2005 | Markhovsky et al. | 455/456.1 |
| 2005/0255865 | A1 * | 11/2005 | Sillasto et al. | 455/456.5 |
| 2005/0267677 | A1 * | 12/2005 | Poykko et al. | 701/207 |

FOREIGN PATENT DOCUMENTS

| | | |
|---|---|---|
| EP | 1 480 483 A2 * | 11/2004 |
| JP | 410111351 A * | 4/1998 |

OTHER PUBLICATIONS

Wang et al. "Wireless Communication Systems: Advanced Techniques for Signal Reception"; Chapter 4.6.1; Sep. 2003.*
Schmidt, R. O. "Multiple Emitter Location and Signal Parameter Estimation"; 1986; 5 pages.*

* cited by examiner

*Primary Examiner*—Igor N Borissov
(74) *Attorney, Agent, or Firm*—Squire, Sanders & Dempsey, L.L.P.

(57) ABSTRACT

An intelligent intersection method and apparatus for network-based positioning include defining a first cell model having a first antenna as a center point and a second cell model having a second antenna as the center point, determining first and second distances from the first and second antennas, respectively, to a mobile station. The method and apparatus define a first circle for the first cell model using the first distance as a radius and a second circle for the second cell model using the second distance as the radius. The method and apparatus further determine first and second intersection points of the first and second circles, and determine a cost function for the first intersection point and the second intersection point relative to the first and second cell models based on parameters defining each cell to select the first or the second intersection point indicative of a location of the mobile station.

33 Claims, 11 Drawing Sheets

VehicularA

| Method | Number of estimates | 25% | 50% | 67% | 90% | 95% | 99% |
|---|---|---|---|---|---|---|---|
| WSS | 971 | 324m | 552m | 732m | 1192m | 1488m | 2359m |
| WSC | 971 | 340m | 562m | 746m | 1191m | 1470m | 2305m |
| WMC | 971 | 501m | 1002m | 1510m | 2532m | 3264m | 4777m |
| II | 971 | 80m | 108m | 174m | 555m | 827m | 1672m |

Suburban

| Method | Number of estimates | 25% | 50% | 67% | 90% | 95% | 99% |
|---|---|---|---|---|---|---|---|
| WSS | 975 | 350m | 592m | 734m | 1208m | 1570m | 2636m |
| WSC | 975 | 355m | 603m | 751m | 1208m | 1503m | 2415m |
| WMC | 264 | 586m | 1056m | 1547m | 2684m | 3242m | 6685m |
| II | 438 | 274m | 522m | 628m | 954m | 1224m | 1822m |

UrbanA

| Method | Number of estimates | 25% | 50% | 67% | 90% | 95% | 99% |
|---|---|---|---|---|---|---|---|
| WSS | 438 | 155m | 243m | 284m | 433m | 507m | 694m |
| WSC | 438 | 155m | 243m | 284m | 433m | 507m | 694m |
| WMC | 438 | 158m | 253m | 321m | 491m | 588m | 876m |
| II | 438 | 145m | 187m | 252m | 388m | 507m | 909m |

UrbanB

| Method | Number of estimates | 25% | 50% | 67% | 90% | 95% | 99% |
|---|---|---|---|---|---|---|---|
| WSS | 655 | 128m | 230m | 305m | 440m | 485m | 583m |
| WSC | 655 | 128m | 227m | 305m | 433m | 485m | 583m |
| WMC | 655 | 139m | 295m | 379m | 579m | 670m | 786m |
| II | 655 | 81m | 177m | 265m | 429m | 516m | 629m |

INTELLIGENT INTERSECTION APPARATUS AND METHOD FOR NETWORK-BASED POSITIONING

BACKGROUND OF THE INVENTION

1. Field of the Invention

The present invention relates to an intelligent intersection determination apparatus and method to determine a location of a mobile station in a cell or similar radio coverage service area, and in particular, but not exclusively, an intelligent intersection apparatus and method to determine a location estimate of a mobile station based on a cost function analysis.

2. Description of the Related Art

A cellular telecommunications system is based around cells or similar radio coverage and/or service areas. Examples of cellular telecommunications systems include standards such as the GSM (Global System for Mobile communications) or various GSM based systems (such as GPRS: General Packet Radio Service), AMPS (American Mobile Phone System) or DAMPS (Digital AMPS) or WCDMA (Wideband Code Division Multiple Access) and TDMA/CDMA (Time Division Multiple Access/Code Division Multiple Access) in UMTS (Universal Mobile Telecommunications System), IMT 2000 and so on.

In the cellular telecommunication system, a base transceiver station (BTS) serves mobile stations or similar wireless user equipment (UE) via an air or radio interface. A base station provides a coverage area that can be defined as a certain geographically limited area referred to as a cell. The size and shape of cells may vary from cell to cell. Several cells may also be grouped together to form a larger service area.

Each of the cells can be controlled by an appropriate controller apparatus. For example, in a GSM radio network the base station may be connected to and controlled by a base station controller (BSC) of a base station subsystem (BSS). The BSC/RNC (radio network controller) may be then connected to and controlled by a mobile switching center (MSC). Other controller nodes may also be provided, such as a serving GPRS support node (SGSN). The MSCs of a cellular network are interconnected and there may be one or more gateway nodes connecting the cellular network, for instance, to a public switched telephone network (PSTN) and other telecommunication networks, such as the Internet and/or other packet switched networks. The mobile station may also be in communication with two or more base stations of the cellular telecommunication system at the same time. The two or more base stations may be connected to the same controller or different controllers.

The cellular telecommunication system can also be employed for provision of location information concerning the mobile station and the user thereof. More particularly, the cells or similar geographically limited service areas facilitate the cellular telecommunications system to produce at least a rough location information estimate concerning a current geographical location of the mobile station, as the cellular telecommunications system is aware of the cell within which the mobile station is currently linked. Therefore, it is possible to determine the geographical location in which the mobile station is likely to be at a given moment. This information is available also when the mobile station is located within the coverage area of a visited or "foreign" network. The visited network may be capable of transmitting location information of the mobile station back to the home network, e.g., to support location services or for the purposes of call routing and charging.

The mobile station is able to move within the cell and also from one cell coverage area to another cell coverage area. Thus, the location of the mobile station may vary in time as the mobile station is free to move within the service area of the system. Accordingly, accurate information concerning the geographical location of a mobile station is desired. In addition, the United States Federal Communication Commission (FCC) has mandated that wireless service providers have to implement location technologies that can locate the mobile station users who are calling to E911 emergency center.

SUMMARY OF THE INVENTION

According to an embodiment of the present invention, there is provided an intelligent intersection method for network-based positioning, including defining a first cell model having a first antenna as a center point and a second cell model having a second antenna as the center point, and determining first and second distances from the first and second antennas, respectively, to a mobile station. The method defines a first circle for the first cell model using the first distance as a radius of the first circle, defines a second circle for the second cell model using the second distance as the radius of the second circle, determines first and second intersection points of the first and second circles, and determines a cost function for the first intersection point and the second intersection point relative to the first and second cell models based on parameters defining each cell to select the first or the second intersection point indicative of a location of the mobile station.

According to an embodiment of the present invention, there is provided an intelligent intersection method for network-based positioning, including defining a first circle for a first cell model using a first distance to a mobile station as a radius of the first circle, and defining a second circle for a second cell model using a second distance to the mobile station as the radius of the second circle. The method further determines first and second intersection points of the first and second circles, and determines a cost function for the first intersection point and the second intersection point relative to the first and second cell models based on parameters defining each cell to select the first or the second intersection point indicative of a location of the mobile station.

According to an embodiment of the present invention, there is provided an intelligent intersection apparatus for network-based positioning, including a base station controller. The base station controller defines a first cell model having a first antenna as a center point and a second cell model having a second antenna as the center point, determines first and second distances from the first and second antennas, respectively, to a mobile station, defines a first circle for the first cell model using the first distance as a radius of the first circle, and defines a second circle for the second cell model using the second distance as the radius of the second circle. A location services node determines first and second intersection points of the first and second circles, and determines a cost function for the first intersection point and the second intersection point relative to the first and second cell models based on parameters defining each cell to select the first or the second intersection point indicative of a location of the mobile station.

According to an embodiment of the present invention, there is provided an intelligent intersection apparatus for network-based positioning, including base station means for defining a first cell model having a first antenna as a center point and a second cell model having a second antenna as the center point, for determining first and second distances from the first and second antennas, respectively, to a mobile station, for defining a first circle for the first cell model using the first distance as a radius of the first circle, for defining a second circle for the second cell model using the second distance as the radius of the second circle. Location services means is provided for determining first and second intersection points of the first and second circles, and for determining a cost function for the first intersection point and the second intersection point relative to the first and second cell models based on parameters defining each cell to select the first or the second intersection point indicative of a location of the mobile station.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 1:
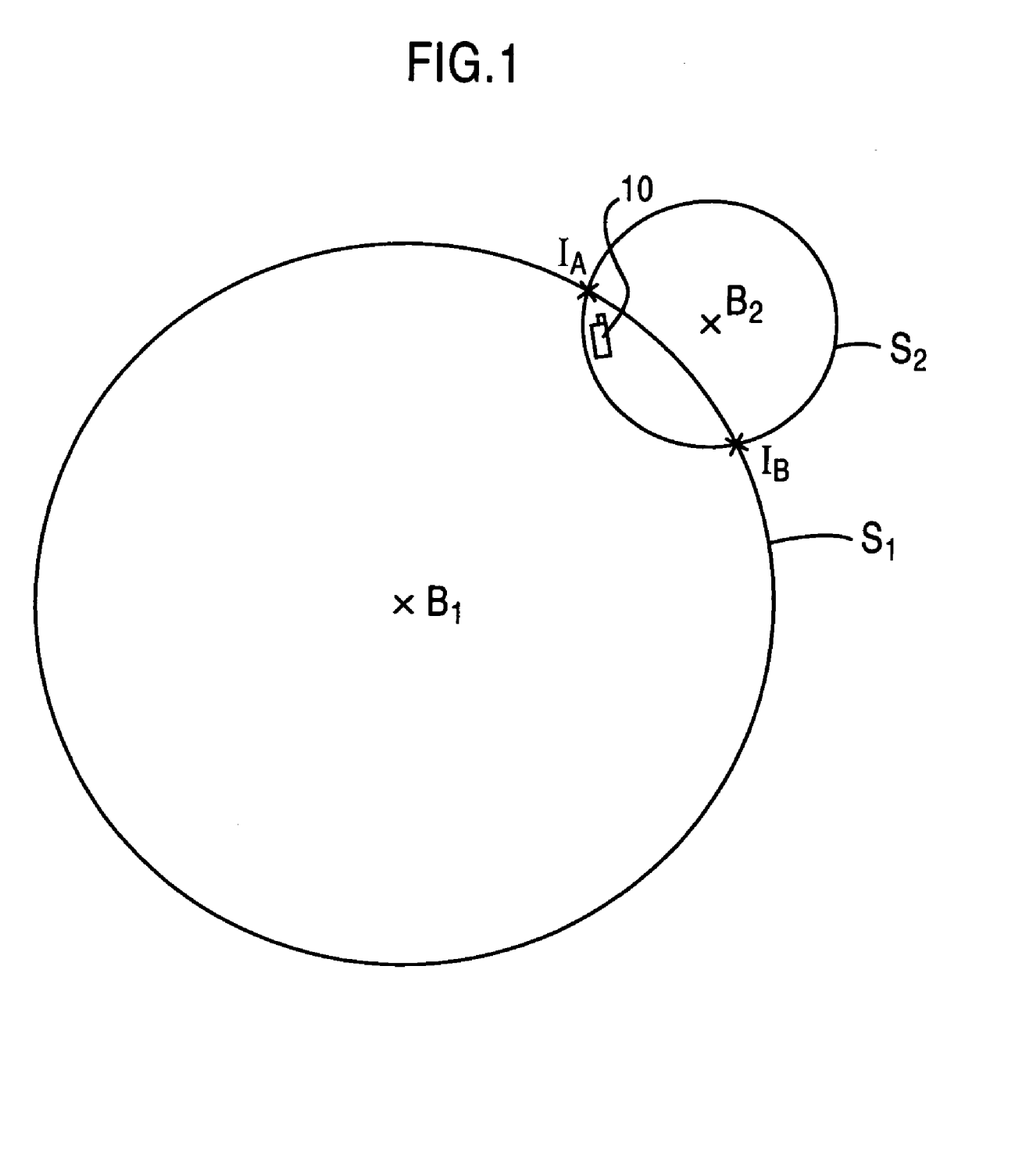
FIG. 1 illustrates a configuration in which at least two base stations are distributed geographically to provide two radio coverage areas in a cellular telecommunications network, in accordance with an embodiment of the present invention.

FIG. 1 illustrates a configuration in which at least two base stations $B_1$ and $B_2$ are distributed geographically to provide two radio coverage areas or service areas $S_1$ and $S_2$ in a cellular telecommunications network, in accordance with an embodiment of the present invention. Even though the exemplifying telecommunications network in the present embodiment uses the terminology of the GSM (Global System for Mobile telecommunications) public land mobile network (PLMN), it should be appreciated that the proposed solution can be used in any cellular system, such as in the 3rd generation WCDMA (Wideband Code Division Multiple Access) UMTS (Universal Mobile Telecommunications System) that provides communications between a mobile station and a base station and some kind of location information service.

Each base station $B_1$ and $B_2$ is arranged to transmit signals to and receive signals from a mobile station 10. Likewise, the mobile station 10 is able to transmit signals to and receive signals from each base station $B_1$ and $B_2$. The mobile station 10 accomplishes this transmission via wireless communication from antennas $L_1$ and $L_2$ (not shown) associated with the base stations $B_1$ and $B_2$, respectively. Although only one mobile station 10 is shown in FIG. 1, typically a number of mobile stations may be in a communication range of multiple base stations, for instance, $B_1$ and $B_2$. The base stations $B_1$ and $B_2$ may provide a sector radio beam coverage provided with directional or sector antennas $L_1$ and $L_2$.

As illustrated in FIG. 1, the mobile station 10 may be in an intersection or handover area. Handover is an essential component for dealing with the mobility of end users. It guarantees a continuity of wireless services when the mobile station (i.e., user) moves across cellular boundaries. As shown in FIG. 1, the mobile station 10 is located in a handover region of the service areas $S_1$ and $S_2$. If a soft handover is in progress, there may be two or more reference locations, although some of the reference locations may correspond to the same geometrical location. In the GSM networks, the distance between the base station and the mobile may be estimated by timing advance measurement (TA). Soft handovers do not exist in GSM, but it may be possible to obtain distance estimates from more than one reference location by using forced handovers.

During soft handover, the mobile station 10 simultaneously communicates with the cells $M_1$ and $M_2$ belonging to the base stations $B_1$ and $B_2$, respectively, of the same radio network controller (RNC) or different RNCs. In the downlink (DL), the mobile station 10 receives signals from the base stations $B_1$ and $B_2$ for maximal ratio combining. In the uplink (UL), a mobile code channel is detected by both base stations $B_1$ and $B_2$ and is routed to the RNC for selection combining.

Typically, if there are two or more base stations, a conventional least means square method or a maximum likelihood analysis may be applied to determine a location of the mobile. A location service feature may be provided by a separate network element such as a location server which receives location information from at least one of the controllers of the system. However, when applied for two reference locations or base stations, the conventional least means square method or similar standard data analysis methods, such as weighted average of either single cell/site location estimates or antenna locations, cannot guarantee the location of the mobile unless some additional information is employed.

In order to provide a solution that would be computationally simple to determine the location or the location estimate of the mobile station 10 instead of performing the conventional maximum likelihood analysis, knowledge of the location of each base station $B_1$ and $B_2$ and a distance estimated of each base station $B_1$ and $B_2$ to the mobile station alone are not enough to determine the location of the mobile station 10. Accordingly, the present invention provides an intelligent intersection apparatus and method for network-based positioning by using cell models and a cost function analysis. The following embodiments are described using two base stations $B_1$ and $B_2$ providing service to the mobile station 10. However, a person of ordinary skill in the art will appreciate that the present invention may be applied to more than two base stations.

Figure 2:
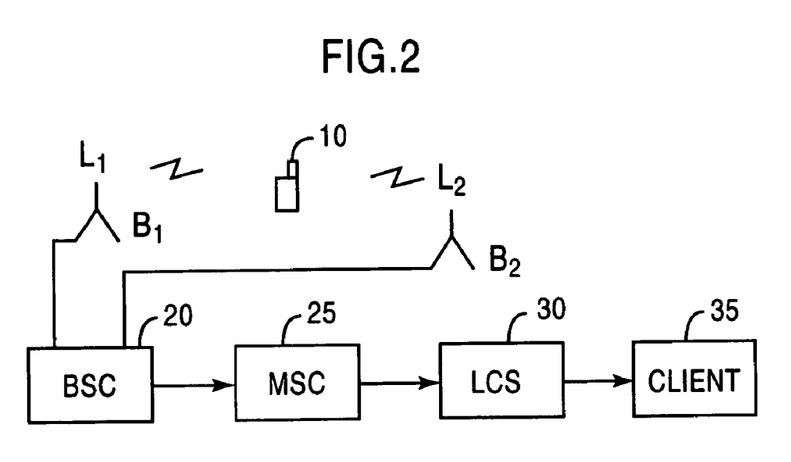
FIG. 2 illustrates an intelligent intersection determination apparatus, in accordance with an embodiment of the present invention.

FIG. 2 illustrates the intelligent intersection determination apparatus, in accordance with an embodiment of the present invention. It should be appreciated that the elements of the location service functionality may be implemented anywhere in the telecommunications system, for instance, at the base stations $B_1$ and $B_2$ or at the mobile station 10, and that the actual location service implementation may be distributed between several elements of the system. Each of the base stations $B_1$ and $B_2$ is operatively connected to a base station controller (BSC) 20. The BSC 20 may be also connected to other network elements, such as to a mobile switching center (MSC) 25 via suitable interconnections.

Figure 3:
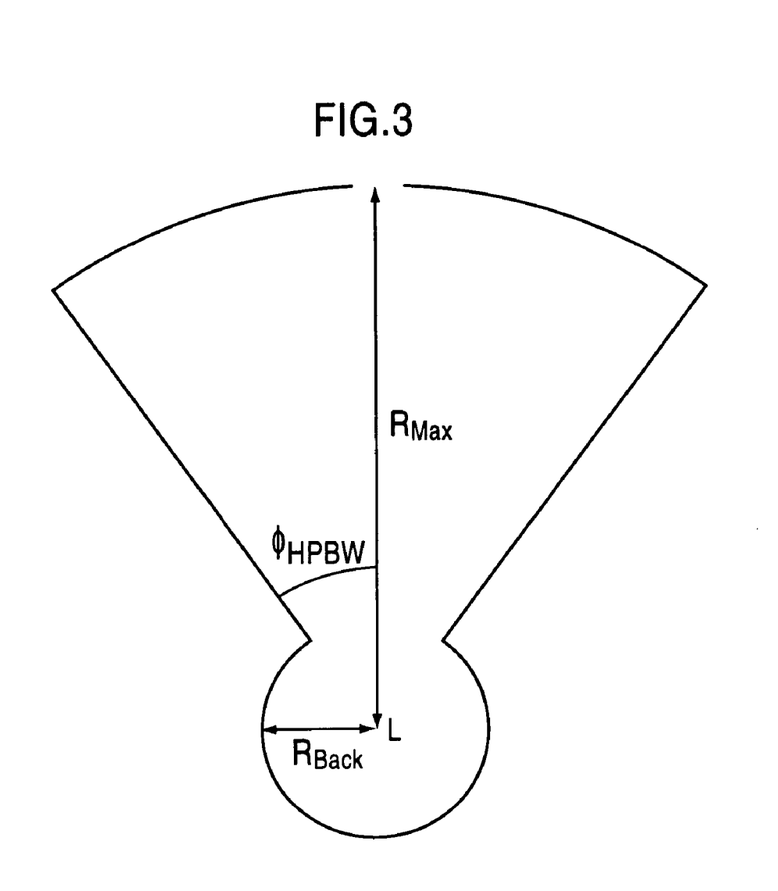
FIG. 3 illustrates cell model parameters associated with a cell model, in accordance with an embodiment of the present invention.

The BSC 20 receives from each base station $B_1$ and $B_2$ parameters or characteristics that are used by the BSC 20 to define the cell model for each corresponding base station $B_1$ and $B_2$, in accordance with an embodiment of the present invention. FIG. 3 illustrates the cell model defined by the BSC 20 using the parameters defining properties associated with the cell model. The cell model may represent an area within which the mobile station 10 wirelessly connected to the cell's antenna L is most likely to be located.

In accordance with an embodiment of the present invention, the BSC 20 defines the properties associated with the cell model using five parameters. A first parameter defines a location of the antenna L of the base station. The location may be defined using coordinates of the antenna L. A second parameter is an antenna bearing defining a main power direction of the antenna L for the particular base station. A third parameter is a half power beam width, $\phi_{HPBW}$, giving a rough idea of an antenna pattern of the cell model. A fourth parameter is $R_{max}$ defining a maximum serving radius of the cell model. A fifth parameter is $R_{back}$ defining a back serving radius of the cell model. The cell model does not depend on distance measurements from the base station to the mobile station 10 or on the location of the mobile station 10 to be determined.

Figure 4:
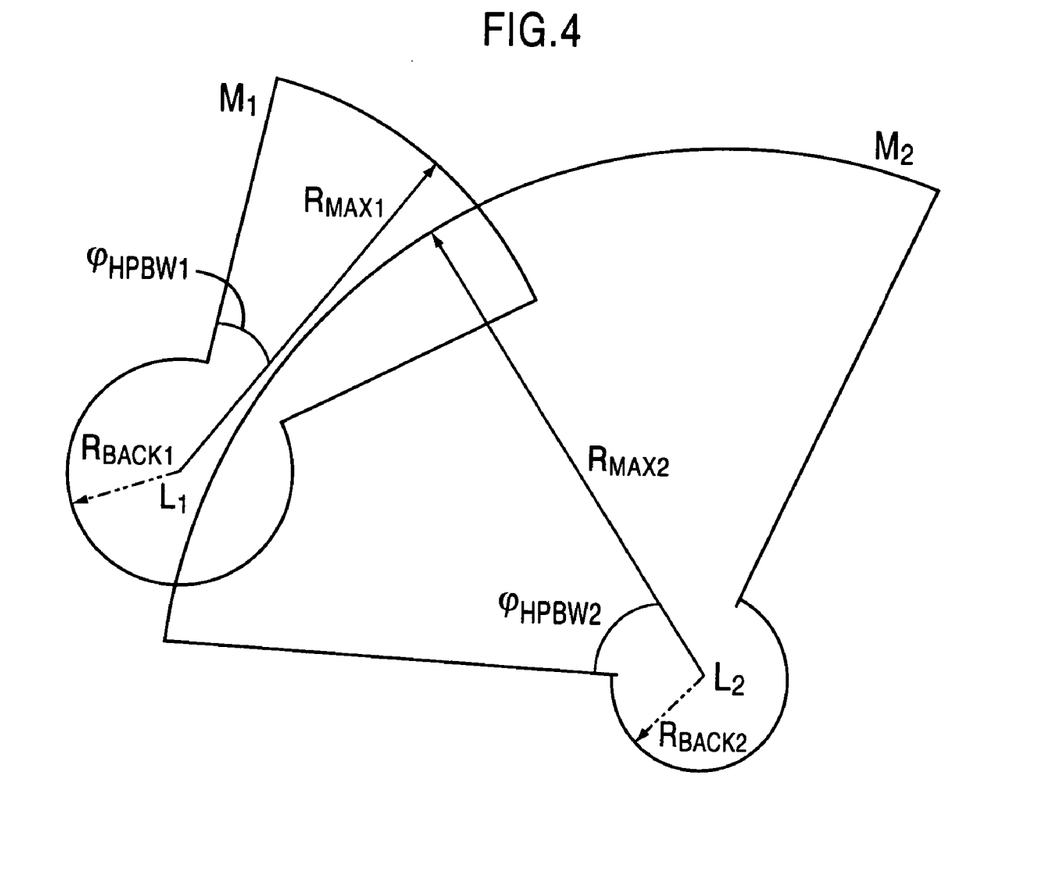
FIG. 4 illustrates the cell model parameters associated with at least two cell models, in accordance with an embodiment of the present invention.

FIG. 4 illustrates the two cell models $M_1$ and $M_2$, each generated by the BSC 20 using the corresponding parameters including the location of each corresponding antenna $L_1$ and $L_2$, $\phi_{HPBW1}$, $\phi_{HPBW2}$, $R_{max1}$, $R_{max2}$, $R_{back1}$, and $R_{back2}$ for the base stations $B_1$ and $B_2$. The two cell models $M_1$ and $M_2$ are involved in a method of locating the mobile station 10, in accordance with an embodiment of the present invention.

Figure 5:
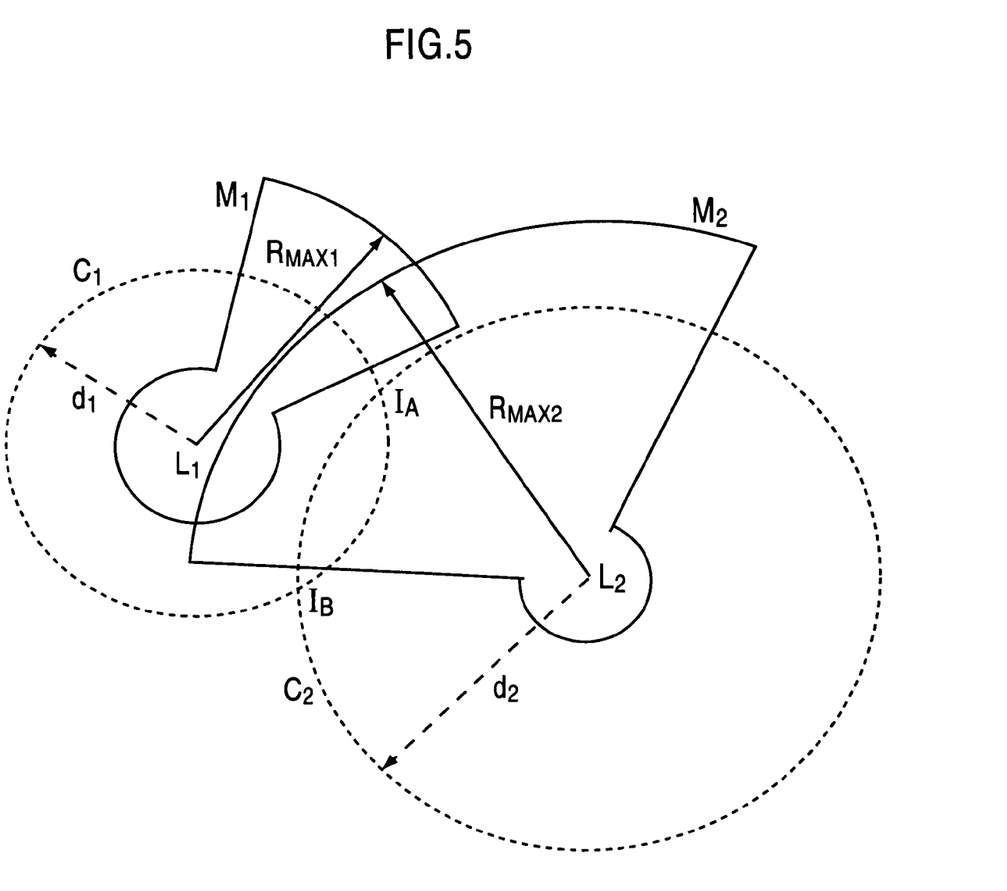
FIG. 5 illustrates a first distance and a second distance between first and second antennas and a mobile station, respectively, in accordance with an embodiment of the present invention.

Once the location of each antenna $L_1$ and $L_2$, is known, as illustrated in FIG. 5, a first distance $d_1$ is determined between the antenna $L_1$ and the mobile station 10 and a second distance $d_2$ is determined between the antenna $L_2$ and the mobile station 10. To determine or estimate the first and second distances $d_1$ and $d_2$, the LCS node 30, may perform a location estimate calculated from measurements by the base stations $B_1$ and $B_2$ or by the mobile station 10 using a conventional location calculation method based on one or more approximations. The conventional method may be, for instance based on a least squares method, passive localization algorithms, or Taylor-series estimations. A person of ordinary skill in the art will appreciate that the first distance $d_1$ and second distance $d_2$ may be equal or different.

The cost function is used to determine the location estimate of the mobile station 10 with respect to each antenna $L_1$ and $L_2$ of each corresponding base station $B_1$ and $B_2$ providing communication services to the mobile station 10. The cost function associates to each point on a plane a non-negative real value. In mathematics, the non-negative real value may be defined as a number that is positive or zero. As illustrated in FIGS. 4 and 5, the cell models $M_1$ and $M_2$ lie on the plane.

Thus, as previously indicated, the first and second distances $d_1$ and $d_2$ may be estimated between the antenna $L_1$ and the antenna $L_2$ and the mobile station 10, respectively. Using each distance, as illustrated in FIG. 5, the BSC 20 forms an imaginary circle $C_1$ with the antenna $L_1$ as a center point and a radius $d_1$, where $d_1$ is the estimated distance from the antenna $L_1$ to the mobile station 10. Similarly, for the cell boundary $M_2$, the BSC 20 forms an imaginary circle $C_2$ with the antenna $L_2$ as the center point and a radius $d_2$, where $d_2$ is the estimated distance from the antenna $L_2$ to the mobile station 10. The BSC 20 transmits data associated with the imaginary circles $C_1$ and $C_2$ and the parameters defining the properties associated with the cell models $M_1$ and $M_2$ for each base station $B_1$ and $B_2$, respectively, via the MSC 25 to a location services (LCS) node 30 as illustrated in FIG. 2.

Figure 6A:
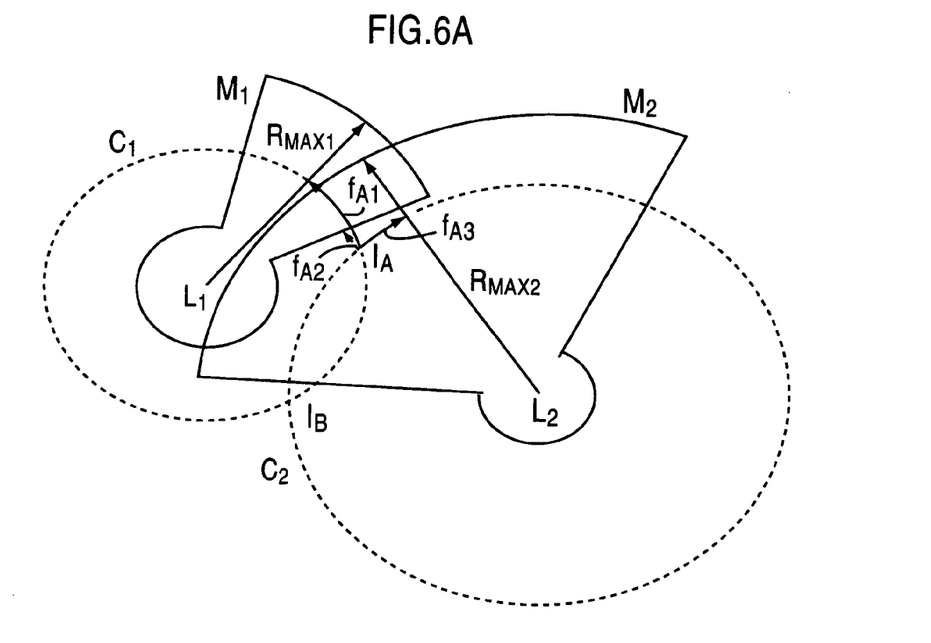
FIGS. 6A and 6B illustrate the cell models considered to apply a cost function analysis, in accordance with an embodiment of the present invention.
Figure 6B:
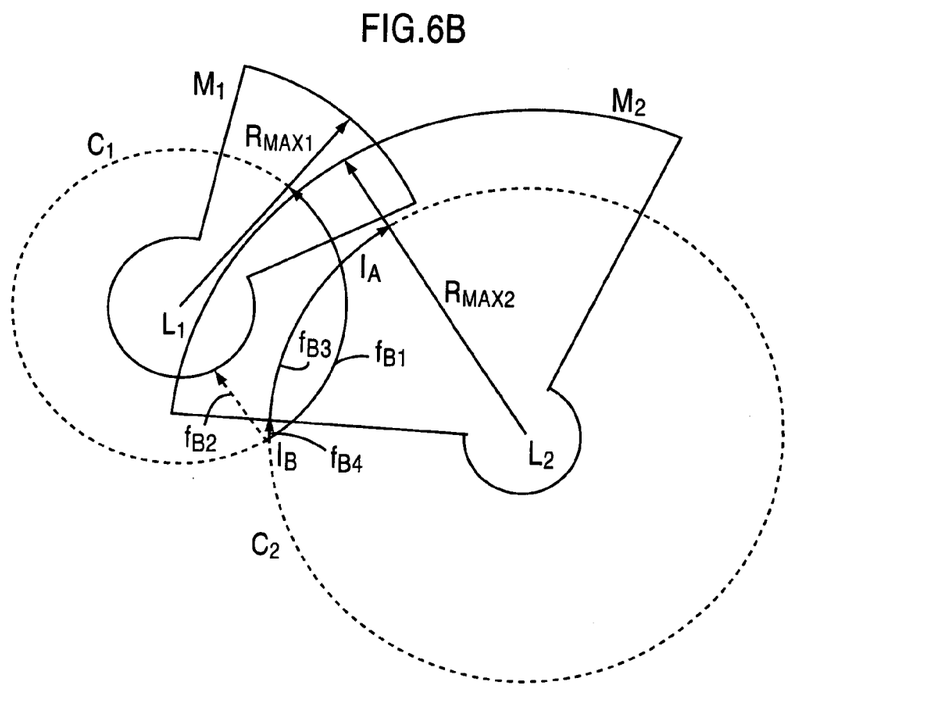

FIGS. 6A and 6B illustrate the imaginary circles $C_1$ and $C_2$ and the cell models $M_1$ and $M_2$ that the LCS 30 considers to apply the cost function analysis, in accordance with an embodiment of the present invention. The cost function is defined where the smaller the non-negative real value of the cost function for an arbitrary point, the more likely it is for this arbitrary point to be connected simultaneously to both cell models $M_1$ and $M_2$, and, accordingly, the more likely it is for the mobile station 10 to be located at this given point.

Based on the parameters associated with the cell models $M_1$ and $M_2$ that the LCS node 30 receives from the BSC 20, the LCS node 30 determines that the circles $C_1$ and $C_2$ intersect at two intersections points $I_A$ and $I_B$. In this instance, the LCS node 30 determines that the arbitrary point could be one of the intersection points $I_A$ or $I_B$ and, accordingly, determines that the mobile station 10 (not shown) may be located close to or at one of the intersections points $I_A$ or $I_B$. The cost function is computed for each intersection point $I_A$ and $I_B$.

In addition, for each intersection point $I_A$ and $I_B$ the cost function includes two parts, the first part is a first cost function component $cf_{cell1}$ of each intersection point $I_A$ and $I_B$ relative to the cell model $M_1$ and the second part is a second cost function component $cf_{cell2}$ of each intersection point $I_A$ and $I_B$ relative to the cell model $M_2$.

Accordingly, as illustrated in FIG. 6A, for the intersection point $I_A$, using the antenna bearing defining the main power direction of the antenna $L_1$, the LCS node 30 defines the first cost function component $cf_{cell1}$ of the intersection point $I_A$, relative to the cell model $M_1$, as including two components, a distance $f_{A1}$ and a distance $f_{A2}$. The distance $f_{A1}$ is a shortest distance along the circle $C_1$ from the intersection point $I_A$ to the antenna bearing of antenna L1. The distance $f_{A2}$ is a shortest distance from the intersection point $I_A$ to the cell model $M_1$. Equation 1 defines the first cost function component $cf_{cell1}$ of the intersection point $I_A$ relative to the cell model $M_1$:

$$cf_{cell1}(I_A) = f_{A1}(I_A) + (\gamma \times f_{A2}(I_A)) \qquad (1)$$

where $\gamma$ is a predetermined fixed value that has been determined during system setup by empirical means. The value of $\gamma$ could be, for example, 10. Once $\gamma$ is determined, its value remains the same for all cell function computations of any arbitrary point. Thus, $\gamma$ is the same predetermined fixed value for the cost function of the intersection points $I_A$ and $I_B$ relative to the cell models $M_1$ and $M_2$, no matter where $I_A$ or $I_B$ may be located.

Next, using the antenna bearing defining the main power direction of the antenna $L_2$, for the intersection point $I_A$, the second cost function component $cf_{cell2}$ of the intersection point $I_A$ relative to the cell model $M_2$ is defined as including two factors, a distance $f_{A3}$ and a distance $f_{A4}$. The distance $f_{A3}$ is the shortest distance along the circle $C_2$ from the intersection point $I_A$ to the antenna bearing of the antenna L2. The distance $f_{A4}$ is the shortest distance from the intersection point $I_A$ to the cell model $M_2$. Because the intersection point $I_A$ in the given example shown in FIG. 6A is inside the cell model $M_2$, the distance $f_{A4}$ is equal to zero. Equation 2 defines the second cost function component $cf_{cell2}$ of the intersection point $I_A$ relative to the cell model $M_2$:

$$cf_{cell2}(I_A)=f_{A3}(I_A)+(\gamma \times f_{A4}(I_A)) \quad (2)$$

Because $f_{A4}$ is zero, the second cost function component $cf_{cell2}(I_A)$ is equal to $f_{A3}(I_A)$. The cost function for intersection point $I_A$ is equal to a sum of first and second cost function components $cf_{cell1}(I_A)$ and $cf_{cell2}(I_A)$ as illustrated in equation 3:

$$cf(I_A)=cf_{cell1}(I_A)+cf_{cell2}(I_A) \quad (3)$$

Subsequently, as illustrated in FIG. 6B, the cost function using the antenna bearing defining the main power direction of the antenna $L_1$ for the intersection point $I_B$, the LCS node 30 defines the first cost function component $cf_{cell1}$ of the intersection point $I_B$ relative to the cell model $M_1$ as including two factors, a distance $f_{B1}$ and a distance $f_{B2}$. The distance $f_{B1}$ is the shortest distance along the circle $C_1$ from the intersection point $I_B$ to the antenna bearing of the antenna $L_1$. The distance $f_{B2}$ is the shortest distance from the intersection point $I_B$ to the cell model $M_1$. If the intersection point $I_B$ would be inside the cell model, then the distance (i.e., distance $f_{B2}$) from the intersection point $I_B$ to the cell model $M_1$ would be equal to zero. Equation 4 defines the first cost function component $cf_{cell1}$ of the intersection point $I_B$ relative to the cell model $M_1$:

$$cf_{cell1}(I_B)=f_{B1}(I_B)+(\gamma \times f_{B2}(I_B)) \quad (4)$$

Next, using the antenna bearing defining the main power direction of the antenna $L_2$ for the intersection point $I_B$, the LCS node 30 defines the second cost function component $cf_{cell2}$ of the intersection point $I_B$ relative to the cell model $M_2$ as including two factors, a distance $f_{B3}$ and a distance $f_{B4}$. The distance $f_{B3}$ is the shortest distance along the circle $C_2$ from the intersection point $I_B$ to the antenna bearing of the antenna $L_2$. The distance $f_{B4}$ is the shortest distance from the intersection point $I_B$ to the cell model $M_2$. Equation 5 defines the second cost function component $cf_{cell2}$ of the intersection point $I_B$ relative to the cell model $M_2$:

$$cf_{cell2}(I_B)=f_{B3}(I_B)+(\gamma \times f_{B4}(I_B)) \quad (5)$$

The cost function for intersection point $I_B$ is equal to a sum of the first and second cost function components $cf_{cell1}(I_B)$ and $cf_{cell2}(I_B)$ as illustrated in Equation 6:

$$cf(I_B)=cf_{cell1}(I_B)+cf_{cell2}(I_B) \quad (6)$$

Based on the results of the cost functions, $cf(I_A)$ and $cf(I_B)$, the LCS node 30 selects the intersection point $I_A$ or $I_B$ for which the cost function $cf(I_A)$ or $cf(I_B)$ yields a smaller value as the location estimate of the mobile station 10. In this instance, as illustrated in FIGS. 6A and 6B, in view of the distances of the intersection point $I_A$ and $I_B$ to each cell model $M_1$ and $M_2$ as determined in Equations 1 through 6, $cf(I_A)$ is positive and much smaller than $cf(I_B)$. Accordingly, the LCS node 30 determines that the location estimate of the mobile station 10 is at the intersection point $I_A$. Referring back to FIG. 2, the LCS node 30 outputs the location estimate of the mobile station 10 as intersection point $I_A$ a client 35 requesting such information. Specifically, the client 35 is a logical functional entity that makes a request to the LCS node 30 for the location information of one or more target mobile stations. In addition, the LCS node 30 may define the accuracy that is desired. The required accuracy may be indicated, for instance, by quality of service (QoS) parameters included in a location information request from the client 35.

Figure 7A:
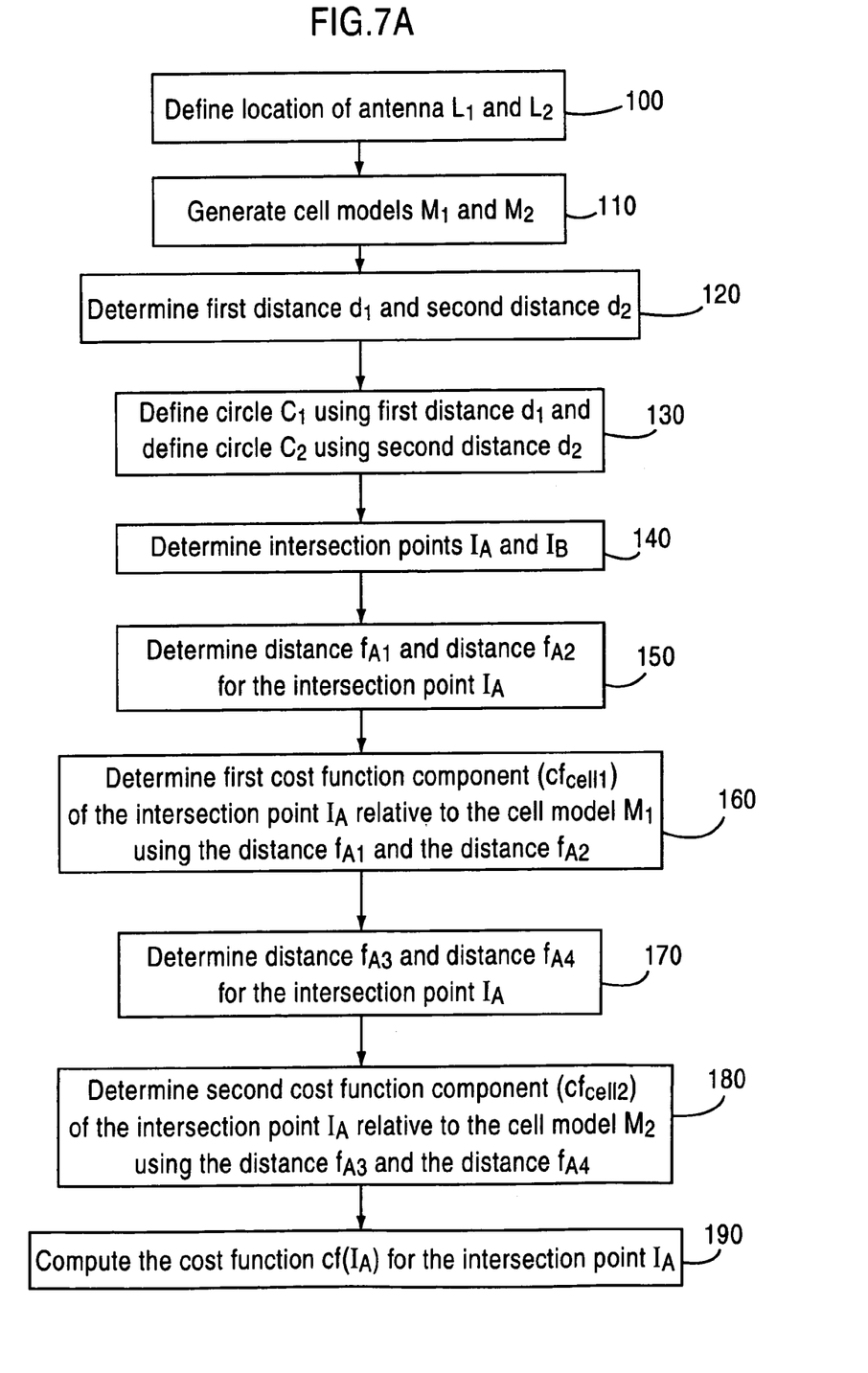
FIGS. 7A and 7B illustrate an intelligent intersection method performed to determine the cost function for each intersection point relative to each cell model, in accordance with an embodiment of the present invention.
Figure 7B:
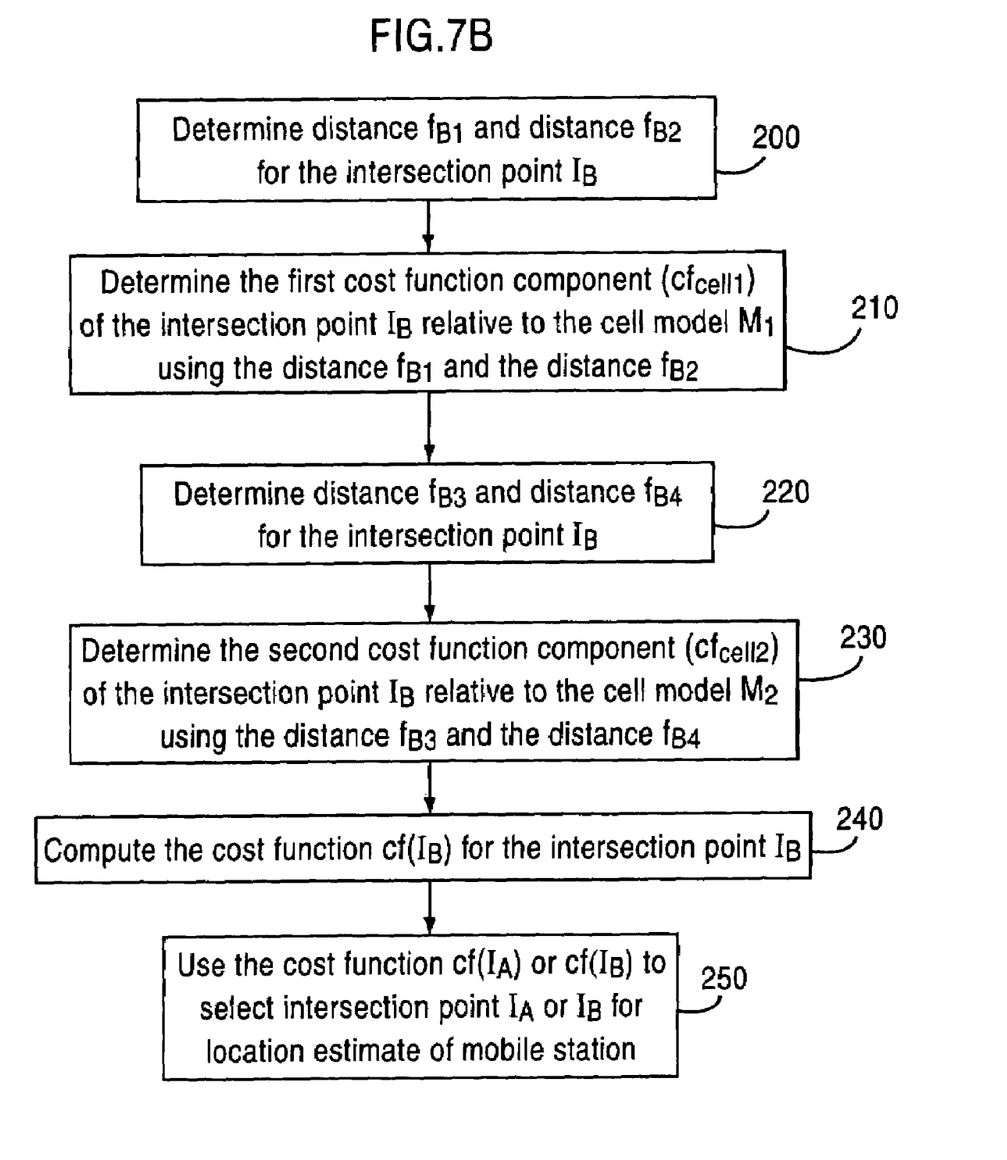

FIGS. 7A and 7B illustrate the intelligent intersection method performed to determine the cost function for the intersection points $I_A$ and $I_B$ relative to each cell model $M_1$ and $M_2$, in accordance with an embodiment of the present invention. At operation 100, the method defines the location of each antenna $L_1$ and $L_2$ of the first and second base stations $B_1$ and $B_2$, respectively. At operation 110, the method generates a cell model for each base station determined to be providing service to the mobile station 10. In this instance, the method generates the cell models $M_1$ and $M_2$ for the base stations B1 and B2, respectively, each cell model defined by the method to include the coordinates of the corresponding antenna L1 or L2, $\phi_{HPBW1}$, $\phi_{HPBW2}$, $R_{max1}$, $R_{max2}$, $R_{back1}$, and $R_{back2}$.

Once the antenna locations $L_1$ and $L_2$ of the base station $B_1$ and $B_2$, respectively, are known, at operation 120, the method determines the first distance $d_1$ between the antenna $L_1$ and the mobile station 10 and the second distance $d_2$ between the antenna $L_2$ and the mobile station 10.

At operation 130, the method defines the circle $C_1$ with the antenna $L_1$ as the center point and the radius $d_1$, and defines the circle $C_2$ with the antenna $L_2$ as the center point and the radius $d_2$. At operation 140, the method determines as the arbitrary points the intersection points $I_A$ and $I_B$. The mobile station 10 would lie on or near one of the intersections points $I_A$ or $I_B$.

After operation 140, the method begins the determination of the cost function for the intersection points $I_A$ and $I_B$ relative to the cell models $M_1$ and $M_2$, in accordance with an embodiment of the present invention.

As previously indicated, for each intersection point $I_A$ and $I_B$ the cost function includes two parts. The first part is the first cost function component $cf_{cell1}$ of each intersection point $I_A$ and $I_B$ relative to the cell model C, and the second part is the second cost function component ($cf_{cell2}$) of each intersection point $I_A$ and $I_B$ relative to the cell model $C_2$.

Using the antenna bearing defining the main power direction of the antenna $L_1$, for the intersection point $I_A$, at operation 150, the method determines the shortest distance $f_{A1}$ along the circle $C_1$ from the intersection point $I_A$ to the antenna bearing of the antenna L1 and the shortest distance $f_{A2}$ from the intersection point $I_A$ to the cell model $M_1$. At operation 160, the method determines the first cost function component $cf_{cell1}$ of the intersection point $I_A$ relative to the cell model $M_1$ using the distance $f_{A1}$ and the distance $f_{A2}$ as follows: $cf_{cell1}(I_A)=f_{A1}(I_A)+(\gamma \times f_{A2}(I_A))$.

Using the antenna bearing defining the main power direction of the antenna $L_2$, for the intersection point $I_A$, at operation 170, the method determines the shortest distance $f_{A3}$ along the circle $C_2$ from the intersection point $I_A$ to the antenna bearing of the antenna L2 and the shortest distance $f_{A4}$ from the intersection point $I_A$ to the cell model $M_1$. At operation 180, the method determines the second cost function component $cf_{cell2}$ of the intersection point $I_A$ relative to the cell model $M_2$ using the distance $f_{A3}$ and a distance $f_{A4}$ as follows: $cf_{cell2}(I_A)=f_{A3}(I_A)+(\gamma \times f_{A4}(I_A))$. At operation 190, the method computes the cost function $cf(I_A)$ for the intersection point $I_A$ as follows: $cf(I_A)=cf_{cell1}(I_A)+cf_{cell2}(I_A)$.

As illustrated in FIG. 7B, using the antenna bearing defining the main power direction of the antenna $L_1$, for the intersection point $I_B$, at operation 200, the method determines the shortest distance $f_{B1}$ along the circle $C_1$ from the intersection point $I_B$ to the antenna bearing of the antenna $L_1$ and the shortest distance $f_{B2}$ from the intersection point $I_B$ to the cell model $M_1$. At operation 210, the method determines the first cost function component $cf_{cell1}$ of the intersection point $I_B$ relative to the cell model $M_1$ using the distance $f_{B1}$ and a distance $f_{B2}$ as follows: $cf_{cell1}(I_B)=f_{B1}(I_B)+(\gamma \times f_{B2}(I_B))$.

Using the antenna bearing defining the main power direction of the antenna $L_2$, for the intersection point $I_B$, at operation 220, the method determines the shortest distance $f_{B3}$ along the circle $C_2$ from the intersection point $I_B$ to the antenna bearing of the antenna L2 and the shortest distance $f_{B4}$ from the intersection point $I_B$ to the cell model $M_1$. At operation 230, the method determines the second cost function component $cf_{cell2}$ of the intersection point $I_B$ relative to the cell model $M_2$ using the distance $f_{B3}$ and a distance $f_{B4}$ as follows: $cf_{cell2}(I_B)=f_{B3}(I_B)+(\gamma \times f_{B4}(I_B))$. At operation 240, the method computes the cost function $cf(I_B)$ for the intersection point $I_B$ as follows: $cf(I_B)=cf_{cell1}(I_B)+cf_{cell2}(I_B)$. At operation 250, the method selects as the location estimate of the mobile station the one of intersection points $I_A$ and $I_B$ for which the cost function $cf(I_A)$ or $cf(I_B)$ yields the smaller value.

Figure 8A:
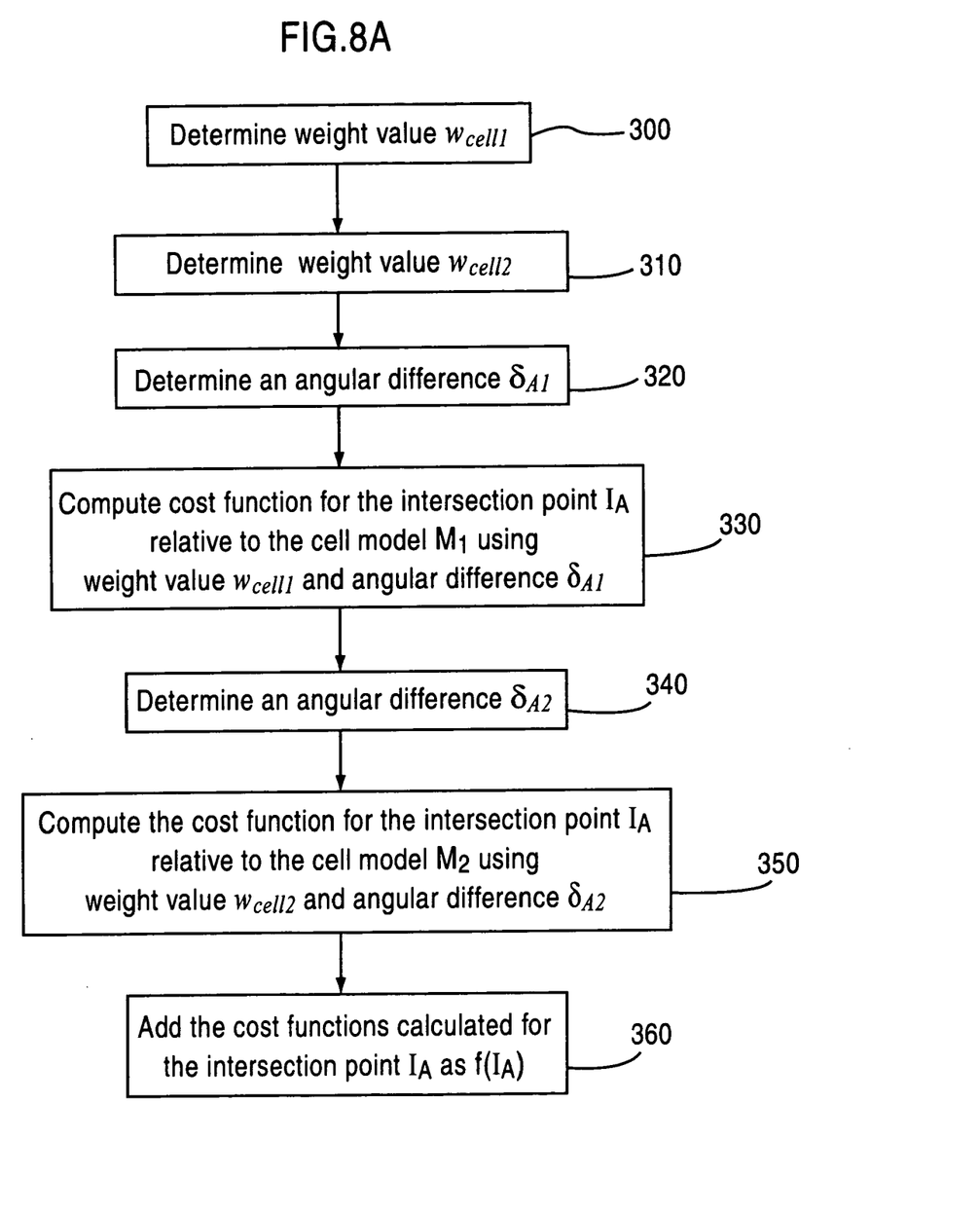
FIGS. 8A and 8B illustrate an alternative intelligent intersection method, in accordance with an embodiment of the present invention.
Figure 8B:
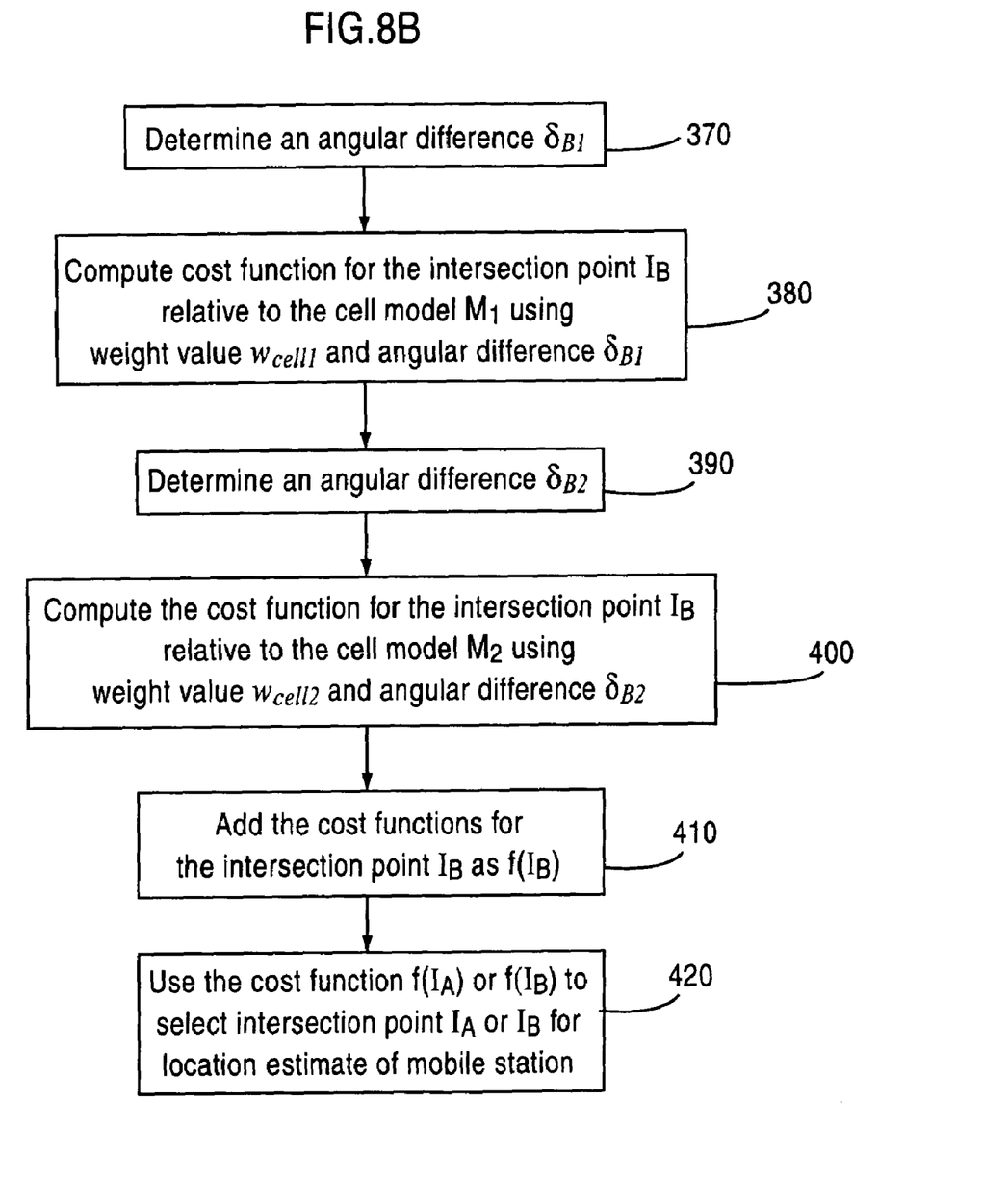

FIGS. 8A and 8B illustrate an alternative intelligent intersection method performed by the BSC 20 and the LCS node 30, in accordance with an embodiment of the present invention. In this alternative intersection method performed by the LCS node 30, the method determines a cost function $f(I_A)$ of the first intersection point and a cost function $f(I_B)$ of the second intersection point relative to the cell models $M_1$ and $M_2$. Operations 100 to 140 as described above and illustrated in FIG. 7A are the same operations executed for the alternative intelligence intersection method of FIGS. 8A and 8B. Accordingly, descriptions of operations 100 to 140 described above are incorporated herein.

After operation 140, the method proceeds to operation 300 of FIG. 8A. At operation 300, the method determines a weight value, $w_{cell1}$, for the intersection point $I_A$ and the intersection point $I_B$ relative to the cell model $M_1$ as follows:

$$w_{cell1}=\phi_{HPBW1}^{-1}/(\phi_{HPBW1}^{-1}+\phi_{HPBW2}^{-1}) \quad (7)$$

where $\phi_{HPBW1}$ is the half power beam width of the cell model $M_1$ and $\phi_{HPBW2}$ is the half power beam width of the cell model $M_2$, both determined at operation 110. At operation 310, the method determines a weight value, $w_{cell2}$, for the intersection point $I_A$ and the intersection point $I_B$ relative to the cell model $M_2$, as follows:

$$w_{cell2}=\phi_{HPBW2}^{-1}/(\phi_{HPBW1}^{-1}+\phi_{HPBW2}^{-1}) \quad (9)$$

Figure 9:
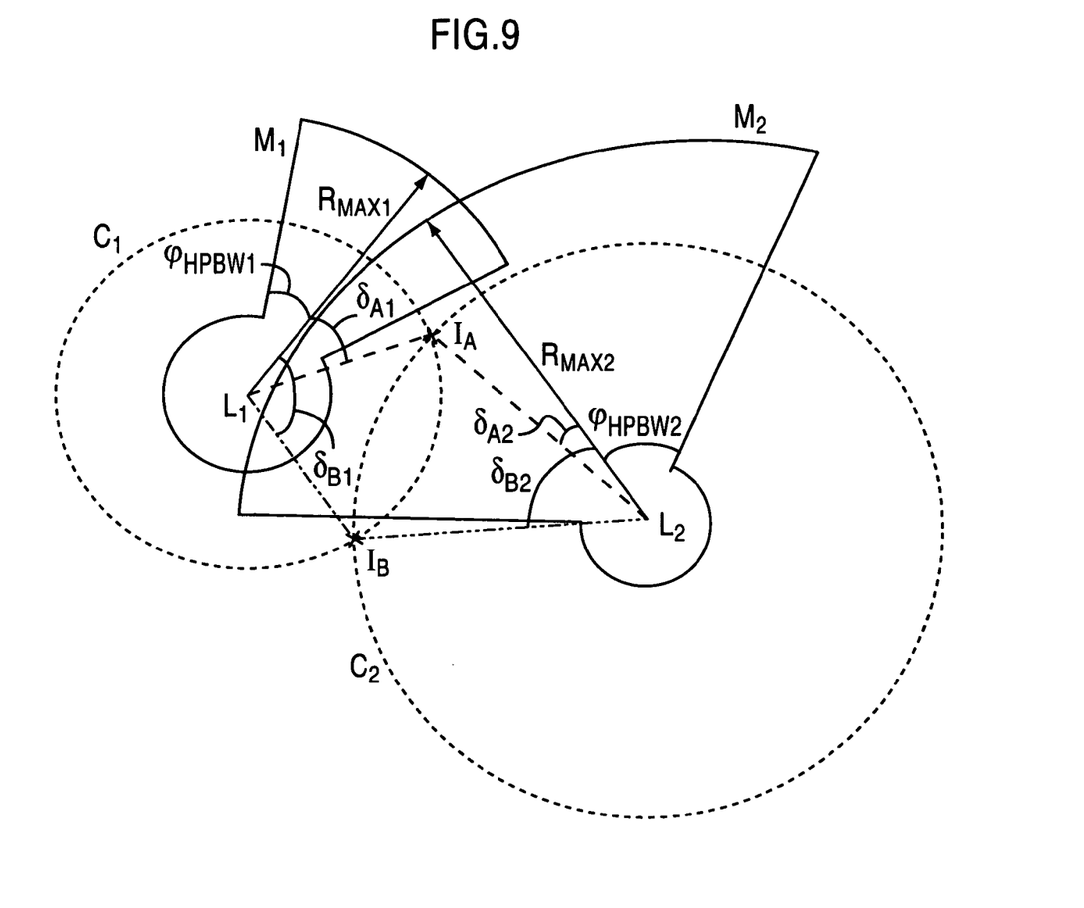
FIG. 9 illustrates angular differences for each intersection point processed by the alternative intelligent intersection method, in accordance with an embodiment of the present invention.

At operation 320, the method determines an angular difference, $\delta_{A1}$, between the bearing of the antenna of the cell model $M_1$ and a straight line from the antenna of the cell model $M_1$ to the intersection point $I_A$. FIG. 9 illustrates the angular difference $\delta_{A1}$ for the intersection point $I_A$. At operation 330, a first cost function component $f_{cell1}(I_A)$ is calculated for the intersection point $I_A$ relative to the cell model $M_1$ as follows:

$$f_{cell1}(I_A)=w_{cell1} \times \delta_{A1} \quad (8)$$

At operation 340, the method determines an angular difference, $\delta_{A2}$, between the bearing of the antenna of the cell model $M_2$ and a straight line from the antenna of the cell model $M_2$ to the intersection point $I_A$. FIG. 9 illustrates the angular difference $\delta_{A2}$ for the intersection point $I_A$. At operation 350, the second cost function $f_{cell2}(I_A)$ is calculated for the intersection point $I_A$ relative to the cell model $M_2$ using Equation 10:

$$f_{cell2}(I_A)=w_{cell2} \times \delta_{A2} \quad (10)$$

At operation 360, the method computes the cost function $f(I_A)$ of the first intersection point by adding the first and second cost function components, $f_{cell1}(I_A)$ and $f_{cell2}(I_A)$, calculated at operation 330 and 350 for the intersection point $I_A$ relative to each cell model $M_1$ and $M_2$ as follows:

$$f(I_A)=f_{cell1}(I_A)+f_{cell2}(I_A) \quad (11)$$

Next, the method proceeds to determine the cost function $f(I_B)$ of the second intersection point, in accordance with the alternative intelligent intersection method performed by the LCS node 30. At operation 370, the method determines an angular difference, $\delta_{B1}$, between the bearing of the antenna of the cell model $M_1$ and a straight line from the antenna of the cell model $M_1$ to the intersection point $I_B$. FIG. 9 illustrates the angular difference $\delta_{B1}$ for the intersection point $I_B$. At operation 380, the first cost function component $f_{cell1}(I_B)$ is calculated for the intersection point $I_B$ relative to the cell model $M_1$ using Equation 13:

$$f_{cell1}(I_B)=w_{cell1} \times \delta_{B1} \quad (13)$$

At operation 390, the method determines an angular difference, $\delta_{B2}$, between the bearing of the antenna of the cell model $M_2$ and a straight line from the antenna of the cell model $M_2$ to the intersection point $I_B$. FIG. 9 illustrates the angular difference $\delta_{B2}$ for the intersection point $I_B$. At operation 400, the second cost function component $f_{cell2}(I_B)$ is calculated for the intersection point $I_B$ relative to the cell model $M_2$ as follows:

$$f_{cell2}(I_B)=w_{cell2} \times \delta_{B2} \quad (14)$$

At operation 410, the method computes the cost function $f(I_B)$ of the second intersection point by adding the first and second cost function components, $f_{cell1}(I_B)$ and $f_{cell2}(I_B)$, calculated at operation 380 and 400 for the intersection point $I_B$ relative to each cell model $M_1$ and $M_2$ as follows:

$$f(I_B)=f_{cell1}(I_B)+f_{cell2}(I_B) \quad (15)$$

At operation 420, the method selects as the location estimate of the mobile station the one of the intersection points $I_A$ and $I_B$ for which the cost function $f(I_A)$ or $f(I_B)$ yields the smaller value.

Figure 10:
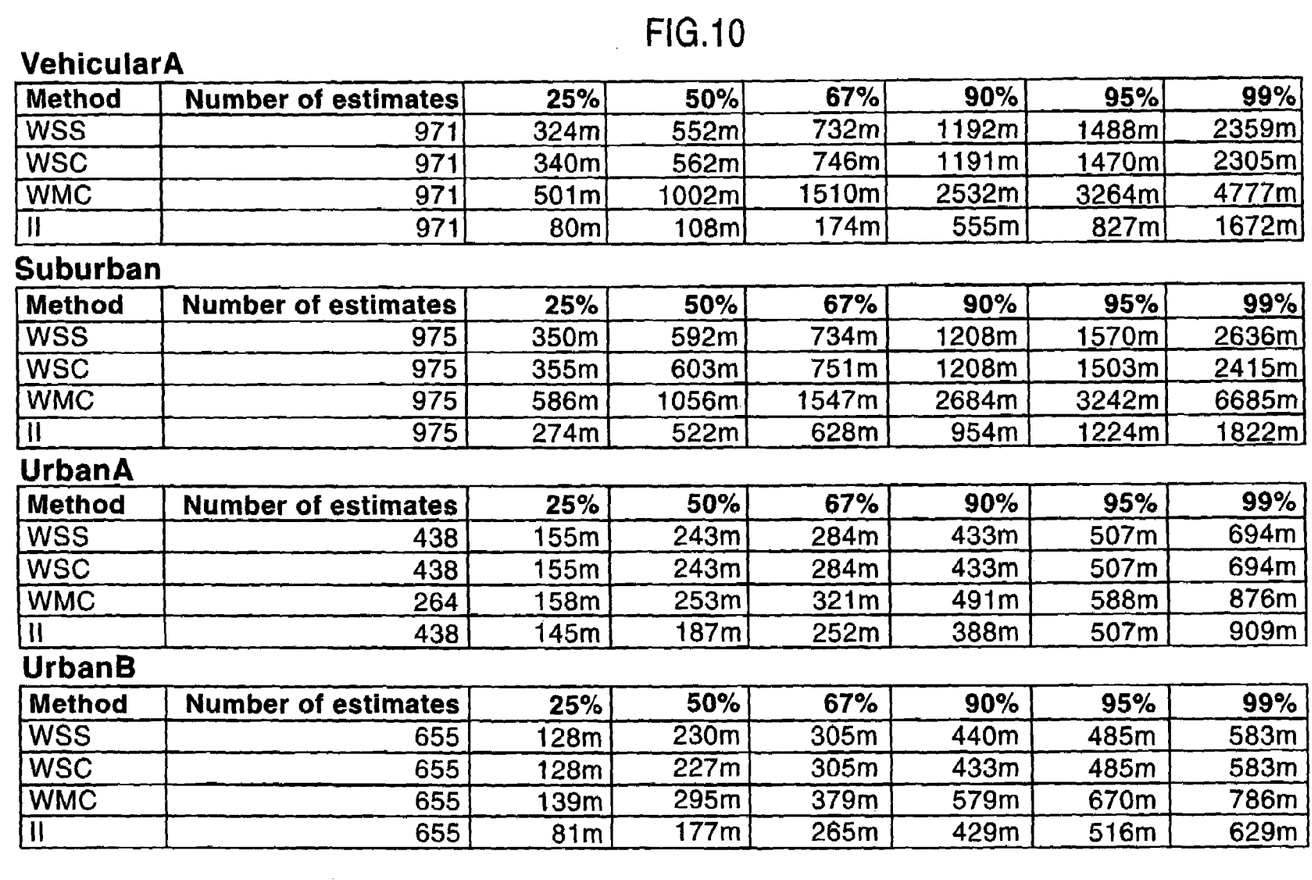
FIG. 10 illustrates tabulated results of the intelligent intersection apparatus and method for network-based positioning, in accordance with an embodiment of the present invention.

FIG. 10 illustrates tabulated results of the intelligent intersection apparatus and method for network-based positioning (II), in accordance with an embodiment of the present invention, compared to conventional methods for location estimation with two reference or base station locations. The conventional methods are abbreviated as Weighted Single Site (WSS), Weighted Single Cell (WSC), and Weighted Mass Center of the Cells (WMC). The results are based on simulations made for different channel models. The results illustrated in FIG. 10 show that the performance of the method and apparatus of the present invention is superior to the performance of conventional methods and provides a significant improvement even in difficult radio conditions.

Accordingly, an intelligent intersection apparatus and method are provided where, for each base station providing service to a mobile station, a distance is estimated from an antenna of each base station to the mobile station. Based on the distances, at least two intersection points are determined. A cell model is defined using parameters or characteristics associated with a serving area of each base station providing service to the mobile station. Each cell model is processed using a cost function to thereby select one of the at least two intersection points that yields a smaller value, indicative of a location estimate of the mobile station.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed:

1. A method, comprising:
   defining, by a controller, a first cell model having a first antenna and a second cell model having a second antenna;
   determining, by the controller, first and second distances from the first and second antennas, respectively, to a mobile station,
   wherein the first cell model and the second cell model are each based on parameters defining each cell and are defined independent of the first and second distances, and
   wherein the parameters comprise at least one of, an antenna bearing defining a main power direction of the antenna, a half power beam width, a maximum serving radius, and a back serving radius;
   defining, by the controller, a first circle for the first cell model using the first distance as a radius of the first circle, the first circle having the first antenna as a center point;
   defining, by the controller, a second circle for the second cell model using the second distance as the radius of the second circle, the second circle having the second antenna as a center point;
   determining, by the controller, first and second intersection points of the first and second circles;
   determining, by the controller, a cost function for the first intersection point and the second intersection point relative to the first and second cell models, wherein each cost function yields a cost function value; and
   selecting, by the controller, the first or the second intersection point indicative of a location of the mobile station based on which cost function value is a smaller value.

2. The method as recited in claim 1, further comprising:
   computing a first cost function component $cf_{cell1}(I_A)$ of the first intersection point relative to the first cell model and comprising a distance $f_{A1}$ and a distance $f_{A2}$, as follows $$cf_{cell1}(I_A) = f_{A1}(I_A) + (\gamma \times f_{A2}(I_A))$$

wherein $I_A$ is the first intersection point, the distance $f_{A1}$ is a shortest distance along the first circle from the first intersection point to a bearing of the first antenna, and the distance $f_{A2}$ is a shortest distance from the first intersection point to the first cell model, and $\gamma$ is a predetermined fixed value.

3. The method as recited in claim 2, further comprising:
   computing a second cost function component $cf_{cell1}(I_A)$ of the first intersection point relative to the second cell model and comprising a distance $f_{A3}$ and a distance $f_{A4}$, as follows $$cf_{cell2}(I_A) = f_{A3}(I_A) + (\gamma \times f_{A4}(I_A))$$

wherein the distance $f_{A3}$ is a shortest distance along the second circle from the first intersection point to the antenna bearing of the second antenna, and the distance $f_{A4}$ is a shortest distance from the first intersection point to the second cell model, and $\gamma$ is the predetermined fixed value.

4. The method as recited in claim 3, wherein the determining of the cost function of the first intersection point comprises adding the first and second cost function components $cf_{cell1}(I_A)$ and $cf_{cell2}(I_A)$, as follows $$cf(I_A) = cf_{cell1}(I_A) + cf_{cell2}(I_A),$$

where $cf(I_A)$ is the cost function of the first intersection point.

5. The method as recited in claim 4, further comprising:
   computing a first cost function component $cf_{cell1}(I_B)$ of the second intersection point relative to the first cell model and comprising a distance $f_{B1}$ and a distance $f_{B2}$, as follows $$cf_{cell1}(I_B) = f_{B1}(I_B) + (\gamma \times f_{B2}(I_B))$$

wherein $I_B$ is the second intersection point, the distance $f_{B1}$ is a shortest distance along the first circle from the second intersection point to the antenna bearing of the first antenna, and the distance $f_{B2}$ is a shortest distance from the second intersection point to the first cell model, and $\gamma$ is the predetermined fixed value.

6. The method as recited in claim 5, further comprising:
   computing a second cost function component $cf_{cell2}(I_B)$ of the second intersection point relative to the second cell model and comprising a distance $f_{B3}$ and a distance $f_{B4}$, as follows $$cf_{cell2}(I_B) = f_{B3}(I_B) + (\gamma \times f_{B4}(I_B))$$

wherein the distance $f_{B3}$ is a shortest distance along the second circle from the second intersection point to the antenna bearing of the second antenna, and the distance $f_{B4}$ is a shortest distance from the second intersection point to the second cell model, and $\gamma$ is the predetermined fixed value.

7. The method as recited in claim 6, wherein the determining of the cost function of the second intersection point comprises adding the first and second cost function components $cf_{cell1}(I_B)$ and $cf_{cell2}(I_B)$, as follows $$cf(I_B) = cf_{cell1}(I_B) + cf_{cell2}(I_B),$$

where $cf(I_B)$ is the cost function of the second intersection point.

8. The method as recited in claim 7, further comprising:
   selecting as the location of the mobile station the one of the first and second intersection points for which the cost function $cf(I_A)$ or $cf(I_B)$ yields a smaller value.

9. The method as recited in claim 8, further comprising:
   determining $\gamma$ during system setup by empirical means, wherein $\gamma$ is the same for $cf_{cell1}(I_A)$, $cf_{cell2}(I_A)$, $cf_{cell1}(I_B)$, and $cf_{cell2}(I_B)$.

10. The method as recited in claim 1, wherein the parameters for each of the first and second cell models comprise an antenna bearing defining a main power direction of the antenna, a half power beam width, a maximum serving radius, and a back serving radius.

11. The method as recited in claim 2, further comprising:
    defining the distance $f_{A2}$ to be equal to zero when the first intersection point is inside the first cell model.

12. The method as recited in claim 3, further comprising:
    defining the distance $f_{A4}$ to be equal to zero when the first intersection point is inside the second cell model.

13. The method as recited in claim 5, further comprising:
    defining the distance $f_{B2}$ to be equal to zero when the second intersection point is inside the first cell model.

14. The method as recited in claim 6, further comprising:
    defining the distance $f_{B4}$ to be equal to zero when the second intersection point is inside the second cell model.

15. The method as recited in claim 1, further comprising:
determining a half power beam width of the first cell model, $\phi_{HPBW1}$, and the half power beam width of the second cell model, $\phi_{HPBW2}$; and
determining a weight value, $w_{cell1}$, for the first and second intersection points relative to the first cell model, as follows $w_{cell1} = \phi_{HPBW1}^{-1}/+(\phi_{HPBW1}^{-1}+\phi_{HPBW2}^{-1})$.

16. The method as recited in claim 15, further comprising:
determining a weight value, $w_{cell2}$, for the first and second intersection points relative to the second cell model, as follows $w_{cell2} = \phi_{HPBW2}^{-1}/+(\phi_{HPBW1}^{-1}+\phi_{HPBW2}^{-1})$.

17. The method as recited in claim 16, further comprising:
determining an angular difference, $\delta_{A1}$, between the bearing of the antenna of the first cell model and a straight line from the antenna of the first cell model to the first intersection point.

18. The method as recited in claim 17, further comprising:
calculating a first cost function component $f_{cell1}(I_A)$ for the first intersection point relative to the first cell model as follows $f_{cell1}(I_A) = w_{cell1} \times \delta_{A1}$.

19. The method as recited in claim 18, further comprising:
determining an angular difference, $\delta_{A2}$, between the bearing of the antenna of the second cell model and a straight line from the antenna of the second cell model to the first intersection point.

20. The method as recited in claim 19, further comprising:
calculating the second cost function component $f_{cell2}(I_A)$ for the first intersection point relative to the second cell model, as follows $f_{cell2}(I_A) = w_{cell2} \times \delta_{A2}$.

21. The method as recited in claim 20, wherein the determining of the cost function of the first intersection point is performed by adding the first function component $f_{cell1}(I_A)$ and the second cost function component $f_{cell2}(I_A)$ for the first intersection point relative to the first and second cell models as follows $f(I_A) = f_{cell1}(I_A) + f_{cell2}(I_A)$, where $f(I_A)$ is the cost function of the first intersection point.

22. The method as recited in claim 21, further comprising:
determining an angular difference, $\delta_{B1}$, between the bearing of the antenna of the first cell model and a straight line from the antenna of the first cell model to the second intersection point.

23. The method as recited in claim 22, further comprising:
calculating a first cost function component $f_{cell1}(I_B)$ for the second intersection point relative to the first cell model as follows $f_{cell1}(I_B) = w_{cell1} \times \delta_{B1}$.

24. The method as recited in claim 23, further comprising:
determining an angular difference, $\delta_{B2}$, between the bearing of the antenna of the second cell model and a straight line from the antenna of the second cell model to the second intersection point.

25. The method as recited in claim 24, further comprising:
calculating the second cost function component $f_{cell2}(I_B)$ for the second intersection point relative to the second cell model, as follows $f_{cell2}(I_B) = w_{cell2} \times \delta_{B2}$.

26. The method as recited in claim 25, wherein the determining of the cost function of the second intersection point is performed by adding the first function component $f_{cell1}(I_B)$ and the second cost function component $f_{cell2}(I_B)$ as follows $f(I_B) = f_{cell1}(I_B) + f_{cell2}(I_B)$, where $f(I_B)$ is the cost function of the second intersection point.

27. The method as recited in claim 26, further comprising:
selecting as the location of the mobile station the one of the first and second intersection points for which the cost function $f(I_A)$ or $f(I_B)$ yields the smaller value.

28. An intelligent intersection method for network-based positioning, comprising:
defining, by a controller, a first circle for a first cell model using a first distance to a mobile station as a radius of the first circle;
defining, by the controller, a second circle for a second cell model using a second distance to the mobile station as the radius of the second circle,
wherein the first cell model and the second cell model are each based on parameters defining each cell and are defined independent of the first and second distances, and
wherein the parameters comprise at least one of, a location of the antenna, an antenna bearing defining a main power direction of the antenna, a half power beam width, a maximum serving radius, and a back serving radius;
determining, by the controller, first and second intersection points of the first and second circles; and
determining, by the controller, a cost function for the first intersection point and the second intersection point relative to the first and second cell models, wherein each cost function yields a cost function value; and
selecting, by the controller, the first or the second intersection point indicative of a location of the mobile station based on which cost function value is a smaller value.

29. An apparatus, comprising:
a controller configured to
define a first cell model having a first antenna and a second cell model having a second antenna,
determine first and second distances from the first and second antennas, respectively, to a mobile station,
define a first circle for the first cell model using the first distance as a radius of the first circle, the first circle having the first antenna as a center point,
define a second circle for the second cell model using the second distance as the radius of the second circle, the second circle having the second antenna as a center point,
wherein the first cell model and the second cell model are each based on parameters defining each cell and are defined independent of the first and second distances, and
wherein the parameters comprise at least one of, an antenna bearing defining a main power direction of the antenna, a half power beam width, a maximum serving radius, and a back serving; and
a location services node configured to
determine first and second intersection points of the first and second circles, determine a cost function for the first intersection point and the second intersection point relative to the first and second cell models, wherein each cost function yields a cost function value, and select the first or the second intersection point indicative of a location of the mobile station based on which cost function value is a smaller value.

30. An apparatus, comprising:

means for defining a first cell model having a first antenna and a second cell model having a second antenna;

means for determining first and second distances from the first and second antennas, respectively, to a mobile station;

means for defining a first circle for the first cell model using the first distance as a radius of the first circle, the first circle having the first antenna as a center point;

means for defining a second circle for the second cell model using the second distance as the radius of the second circle, the second circle having the second antenna as a center point, wherein the first cell model and the second cell model are each based on parameters defining each cell and are defined independent of the first and second distances, and wherein the parameters comprise at least one of, a location of the antenna, an antenna bearing defining a main power direction of the antenna, a half power beam width, a maximum serving radius, and a back serving radius;

means for determining first and second intersection points of the first and second circles;

means for determining a cost function for the first intersection point and the second intersection point relative to the first and second cell models, wherein each cost function yields a cost function value; and means for selecting the first or the second intersection point indicative of a location of the mobile station based on which cost function value is a smaller value.

31. The apparatus as recited in claim 29, wherein the location services node is further configured to compute a first cost function component $cf_{cell1}(I_A)$ of the first intersection point relative to the first cell model and comprising a distance $f_{A1}$ and a distance $f_{A2}$, as follows $$cf_{cell1}(I_A) = f_{A1}(I_A) + (\gamma \times f_{A2}(I_A))$$

wherein $I_A$ is the first intersection point, the distance $f_{A1}$ is a shortest distance along the first circle from the first intersection point to a bearing of the first antenna, and the distance $f_{A2}$ is a shortest distance from the first intersection point to the first cell model, and $\gamma$ is a predetermined fixed value.

32. The apparatus as recited in claim 29, wherein the parameters for each of the first and second cell models comprise an antenna bearing defining a main power direction of the antenna, a half power beam width, a maximum serving radius, and a back serving radius.

33. The apparatus as recited in claim 29, wherein the controller is further configured to determine a half power beam width of the first cell model, $\phi_{HPBW1}$, and the half power beam width of the second cell model, $\phi_{HPBW2}$, and determine a weight value, $w_{cell1}$, for the first and second intersection points relative to the first cell model, as follows $$w_{cell1} = \phi_{HPBW1}^{-1} / (\phi_{HPBW1}^{-1} + \phi_{HPBW2}^{-1}).$$

* * * * *